United States Patent
Evenson et al.

(10) Patent No.: US 9,256,657 B1
(45) Date of Patent: Feb. 9, 2016

(54) TRACKING DATA COMMUNICATED BETWEEN SERVICES

(71) Applicant: AMAZON TECHNOLOGIES, INC., Reno, NV (US)

(72) Inventors: Andrew Ross Evenson, Seattle, WA (US); Masud Ahmed Khan, Seattle, WA (US); Jeremy David McCarthy, Redmond, WA (US); Muralidharan Subramani, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 175 days.

(21) Appl. No.: 13/916,772

(22) Filed: Jun. 13, 2013

(51) Int. Cl.
*G06F 17/30* (2006.01)
(52) U.S. Cl.
CPC ................ *G06F 17/30569* (2013.01)
(58) Field of Classification Search
CPC ............................................. G06F 17/30371
See application file for complete search history.

(56) References Cited

U.S. PATENT DOCUMENTS

| | | | |
|---|---|---|---|
| 2005/0055369 A1* | 3/2005 | Gorelik et al. | 707/102 |
| 2011/0225173 A1* | 9/2011 | Gulhane et al. | 707/749 |
| 2014/0337331 A1* | 11/2014 | Hassanzadeh et al. | 707/726 |

* cited by examiner

*Primary Examiner* — Khanh Pham
(74) *Attorney, Agent, or Firm* — Lindauer Law, PLLC (57) ABSTRACT

Techniques are described for tracking data objects transferred among multiple services in a computing environment. Services that are involved in the transfer of data objects may be instrumented to generate recordings that describe outbound and inbound transfers of data objects. The recordings may be analyzed to identify key-value pairs included in the transferred data objects, where the key corresponds to a data attribute that stores a particular value in a data object. For each pair of keys that are associated with a same or substantially similar value, a correlation metric may be updated for each instance of association. Over time, the correlation metric may indicate a higher degree of correlation for those pairs of keys that frequently share a same value. Pairs of keys exhibiting an above-threshold correlation count may be designated as related in that they are involved in the transfer of data objects.

20 Claims, 9 Drawing Sheets

TRACKING DATA COMMUNICATED BETWEEN SERVICES

BACKGROUND

Commercial enterprises and other organizations often generate and store large amounts of data related to their operations. For example, an online business may generate and store data describing products, sale transactions, customers, vendors, online activities of customers, and so forth. Because such data may be transferred between multiple services or systems, it may be challenging to identify a particular service or system that originates corrupted data. Traditionally, the source code of services involved in the data transfer may be manually examined to trace corrupted data back to its origin. However, such manual examination of source code may be time consuming or unreliable.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for tracking data objects transferred among multiple services or systems in a computing environment. Services that are involved in the transfer of data objects may be instrumented or otherwise modified to generate recordings that describe outbound and inbound transfers of data objects. The recordings may be analyzed to identify key-value pairs included in the transferred data objects, in which the key corresponds to a data attribute that stores a particular value in a data object. For each pair of keys that are associated with a same value, a correlation metric may be updated for each instance of association. Over time, the correlation metric may indicate a higher degree of correlation for those pairs of keys that frequently share a same value. Pairs of keys exhibiting an above-threshold correlation metric may be designated as related in that they frequently transfer data objects between one another.

The determined relationships may be employed to trace the path followed by a data object as it is transferred among multiple services in a computing environment. The relationships may also be employed to identify a system or service that originates the data included in a particular data object. When a determination is made that data in a particular data object is corrupted, the correlation information may be employed to trace the path followed by the corrupted data back to its originating service or system. In this way, implementations may enable an identification of the origin of corrupted data without examination of the source code of the various services involved in the data transfer. Accordingly, implementations provide a means of determining the origin of corrupted code that may be at least partly automated, and that may be more reliable and more efficient than traditional methods for identifying an origin of corrupted data.

A data object may include a collection of any amount of data that is stored in any format. The data included in a data object may be any type of data. In some cases, the data may be generated and employed in an electronic commerce environment in computing systems that support the operations of one or more online merchants of products or services. For example, a data object may include information describing orders, items within an order, shipments, payments, refunds, payment instruments, financial records, customers, vendors, suppliers, and so forth. In some cases, the data in the data object may be encrypted, encoded, or otherwise secured against unauthorized access. For example, the data objects transferred among services in a computing environment may be encrypted using any version of the Secure Sockets Layer (SSL) or Transport Layer Security (TLS) protocol, and the services that send and receive data objects may employ one or more public or private cryptographic keys, digital certificates, or other credentials to encrypt and decrypt the data included in the data objects. In some implementations, the data objects may be formatted according to a particular structure or schema that includes metadata described in a markup language such as the Extensible Markup Language (XML). In some cases, the data objects may be arranged according to a version of the JavaScript Object Notation (JSON) standard described in the Network Working Group Request for Comments (RFC) 4627.

A service may include any type of software that executes on a computing system to provide functionality to users or to other services in communication with the computing system over a network. In some cases, a service may include an Application Programming Interface (API) that exposes one or more methods or functions to be employed by other processes or services. For example, a service that provides access to shipment information stored in a data storage system may expose methods for retrieving a shipment record from the data storage system, storing a new shipment record, modifying an existing shipment record, determining a number of stored shipment records, and so forth. A service may provide or expose any number of methods or functions that are accessible to users or to other services. Such methods or functions may be public and substantially accessible without restriction. Alternatively, such methods or functions may be private, and accessible to particularly designated users or services.

Figure 1:
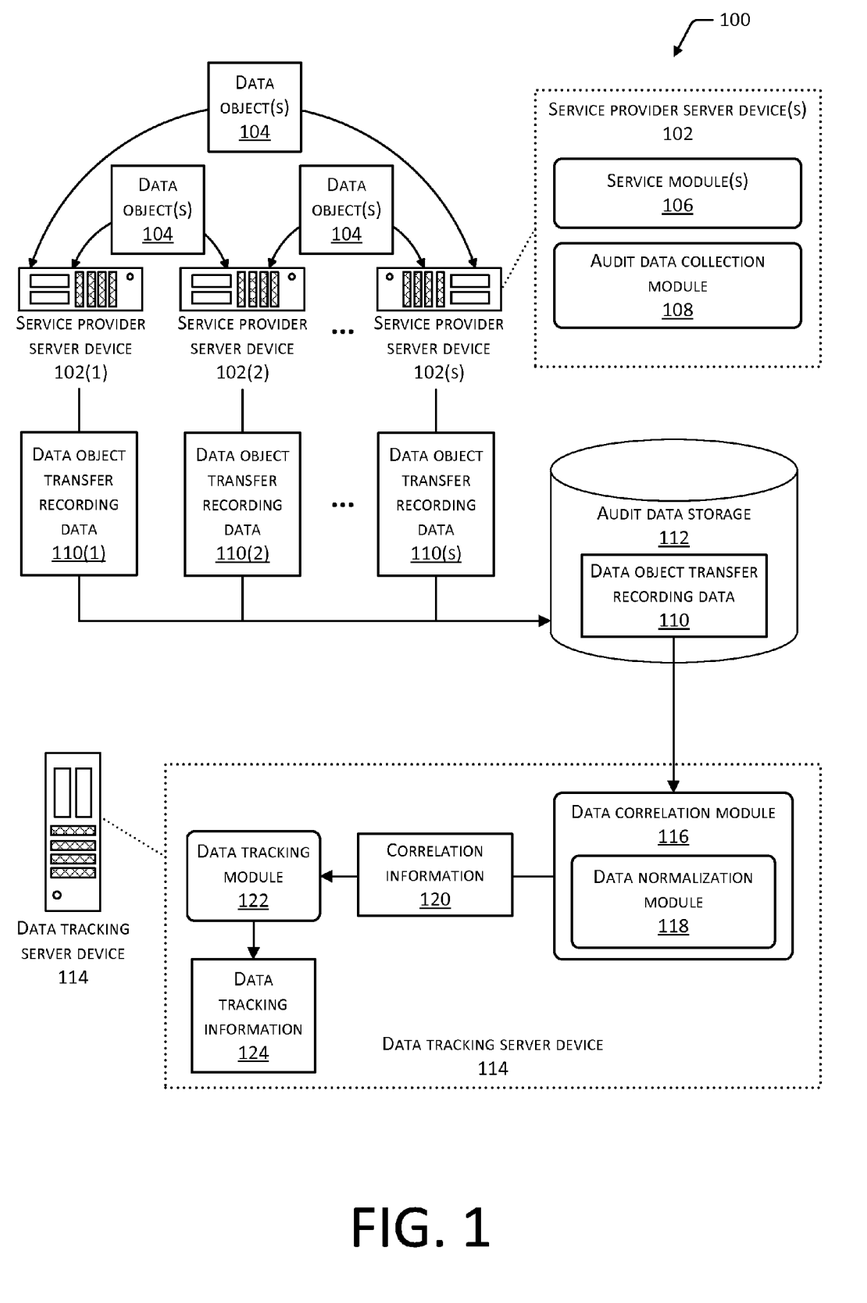
FIG. 1 depicts an environment in which multiple data objects are transferred among multiple computing services, the environment including a data tracking server device that identifies correlations in data object transfer recordings and determines data flow patterns based on the correlations.

FIG. 1 depicts an environment 100 in which multiple services, hosted by one or more service provider server devices 102, may participate in the transfer of multiple data objects 104. The service provider server devices 102 may include any type of computing device, including but not limited to a mainframe computer, a server computer, a network computer, a cloud computing server, a distributed computing server, a smartphone, a tablet computer, a wearable computer, an implanted computer, a mobile gaming device, an electronic book reader, an automotive computer, a desktop computer, a personal computer, a laptop computer, a thin client, a terminal, a game console, a smart appliance, a home entertainment device, and so forth. The service provider server devices 102 are described further with reference to FIG. 2.

Each of the service provider server devices 102 may include one or more service modules 106 that execute on the service provider server device 102 to provide one or more services. In some implementations, the service provider server devices 102 may include an audit data collection module 108 that generates data object transfer recording data 110. In some implementations, service module(s) 106 may be instrumented or otherwise modified to include the audit data collection module 108. Alternatively, the audit data collection module 108 may execute separately from the service module(s) 106. Each of the service provider server devices 102 may host and execute any number of service modules 106. The data object(s) 104 may be transferred between service modules 106 executing on different physical or virtual service provider server devices 102, or between service modules 106 executing on a same physical or virtual service provider server device 102.

The data object transfer recording data 110 may include one or more transfer recordings that describe one or more transfers of one or more data objects 104 to or from the service provider server device 102. The data object transfer recording data 110 may include information describing a sender or a receiver of a transferred data object 104, and a date and time when the data object 104 was sent or received. The data object transfer recording data 110 may also include information describing the network used to transfer the data object 104, such as the secure or non-secure communication protocol employed, the latency, speed, throughput, capacity, or bandwidth of the network, a time-to-live (TTL) of the network connection or communication session, or other information regarding the network.

The data object transfer recording data 110 may also include a description of at least a portion of the data included in the transferred data object 104. This description may include key-value pair information including one or more keys corresponding to data attributes in the data object 104, and one or more values associated with the one or more keys. For example, in cases where the data object 104 includes a key corresponding to a data attribute "price" with a value "19.99 USD," the data object transfer recording data 110 may include a key-value pair of "price" associated with "19.99 USD." The data object transfer recording data 110 may include data in any format.

The service provider server devices 102 may each send data object transfer recording data 110 to audit data storage 112, which stores the data object transfer recording data 110. The audit data storage 112 may include any number of data storage systems that employ any type of data storage technology. The audit data storage 112 may include a relational datastore that employs a relational storage format including one or more formally described tables, each table including one or more columns associated with data attributes. The audit data storage 112 may include a non-relational datastore, such as a hierarchical database, a network database, a key-value datastore, a hash table, a document store, a flat file, an associative array, and so forth. The audit data storage 112 may include, but is not limited to, data storage systems managed through any of the following: Oracle®, MySQL®, Lotus Notes®, Lotus Domino®, and Oracle® NoSQL database, from Oracle Corporation® of Redwood City, Calif.; DB2®, from International Business Machines® (IBM) Corporation of Armonk, N.Y.; Linter®, from the RELEX Group® of Voronezh, Russia; FoxPro® database management system, Microsoft Access®, and Microsoft SQL Server®, from Microsoft Corporation® of Redmond, Wash.; PostgreSQL®, from the PostgreSQL Global Development Group; SQLite®, from D. Richard Hipp; ParAccel® Analytic Database, from ParAccel, Incorporated® of San Diego, Calif.; Hadoop® and CouchDB® from the Apache Software Foundation®; or any type of NoSQL database.

The environment 100 may include a data tracking server device 114, which may be any type of computing device including those listed above with reference to the service provider server devices 102. The data tracking server device 114 is described further with reference to FIG. 3. The data tracking server device 114 may execute one or more software modules, including a data correlation module 116. The data correlation module 116 may retrieve the data object transfer recording data 110, and analyze the data object transfer recording data 110 to identify correlations between keys described in the data object transfer recording data 110. In some implementations, the data correlation module 116 may include a data normalization module 118 which performs operations to normalize or otherwise process the data object transfer recording data 110 prior to its analysis by the data correlation module 116. In some implementations, the data normalization module 118 may process the data object transfer recording data 110 to identify one or more key-value pairs included in the data object transfer recording data 110. The data normalization module 118 may generate a processed (e.g., redacted or flattened) version of the data object transfer recording data 110 that includes a list of one or more key-value pairs extracted from the data object transfer recording data 110, but that may not include other data originally present in the data object transfer recording data 110. The data normalization operations performed by the data normalization module 118 are described further with reference to FIGS. 4 and 7.

In some implementations, the data correlation module 116 may analyze the key-value pairs extracted from the data object transfer recording data 110, and identify pairs of keys that are associated with a same value. Alternatively, the data correlation module 116 may identify pairs of keys that are associated with values that are substantially similar in that they are within a predetermined threshold range of one another. For each pair of keys that have a same value, or a substantially similar value, the data correlation module 116 may create or update correlation information 120 that describes a level of association between the pair of keys. In some implementations, the correlation information 120 may include a list of pairs of keys, and each pair of keys may be associated with a correlation metric that tracks a level of association between the keys. For example, the correlation metric may be a correlation count of a number of instances when the pair of keys was associated with a same or substantially similar value. The correlation information 120 is described further with reference to FIG. 5.

Over time, the correlation metric may indicate a higher level of correlation for those pairs of keys that more frequently share a same or similar value compared to other pairs of keys. The correlation information 120 may be employed by a data tracking module 122 to determine relationships between services based on the correlation information 120. In some implementations, pairs of keys that exhibit a correlation metric above a predetermined threshold may be designated as related in that the services associated with the keys frequently transfer data objects 104 between one another. Such relationships may be employed to identify an origin system or origin service for a particular set of data included in a data object 104. Based on its analysis of the correlation information 120, the data tracking module 122 may generate data tracking information 124 that describes at least a portion of a path followed by a data object 104 as it is transferred among the service provider server device(s) 102 and the server module(s) 106 in the environment 100. Operations of the data tracking module 122 are described further with reference to FIGS. 8 and 9.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), and mobile communications networks (e.g. 3G, 4G, and so forth). In some implementations, communications between the various devices in the environment 100 may be encrypted or otherwise secured. For example, such communications may employ one or more public or private cryptographic keys, digital certificates, or other credentials supported by a security protocol such as any version of the SSL or the TLS protocol.

Figure 2:
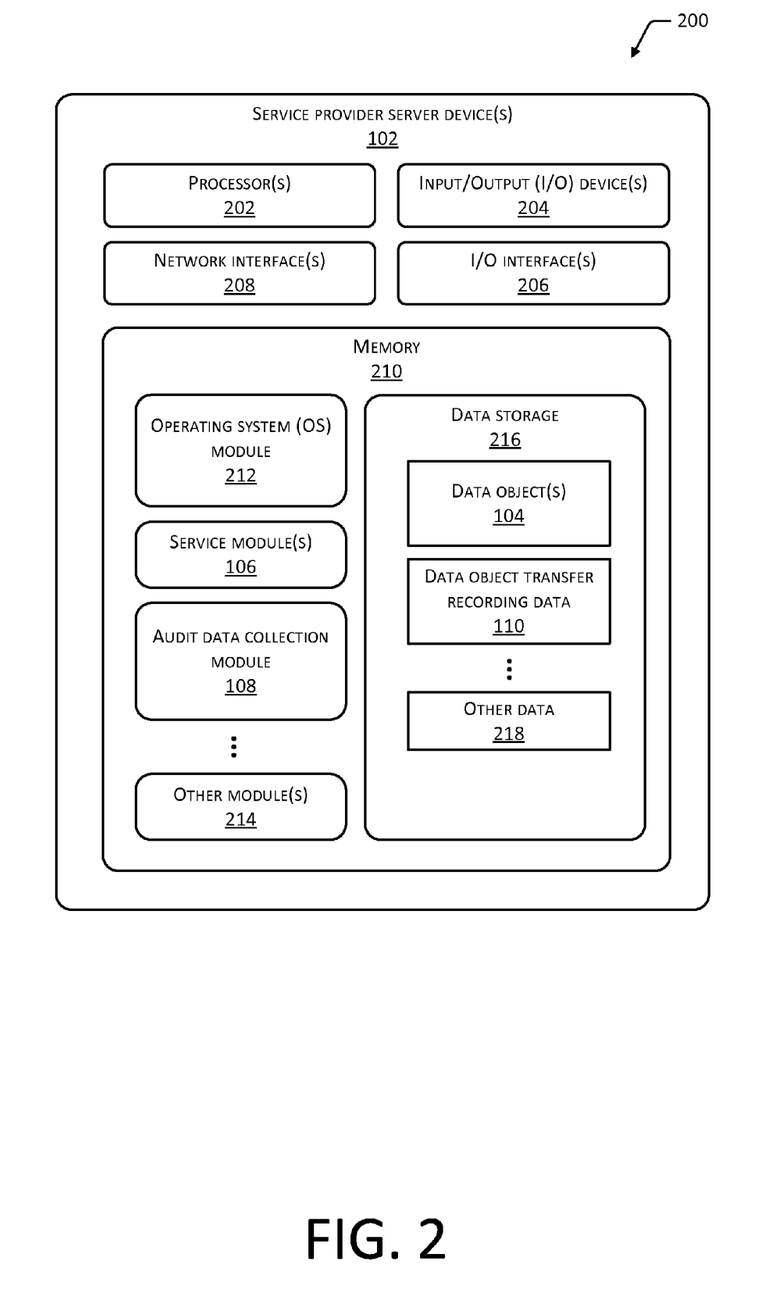
FIG. 2 depicts a block diagram of an example service provider server device configured to generate data object transfer recording data describing inbound or outbound transfers of data objects.

FIG. 2 depicts a block diagram 200 of an example service provider server device 102 configured to generate the data object transfer recording data 110 describing inbound or outbound transfers of one or more data objects 104. As shown in the block diagram 200, the service provider server device 102 may include one or more processors 202 configured to execute one or more stored instructions. The processor(s) 202 may comprise one or more cores.

The service provider server device 102 may include one or more input/output (I/O) devices 204. The I/O device(s) 204 may include input devices such as a keyboard, a mouse, a pen, a game controller, a touch input device, an audio input device (e.g., a microphone), an image capture device (e.g., a camera), a gestural input device, a haptic input device, or other devices. In some cases, the I/O device(s) 204 may also include output devices such as a display, an audio output device (e.g., a speaker), a printer, a haptic output device, and so forth. The I/O device(s) 204 may be physically incorporated with the service provider server device 102, or may be externally placed.

The service provider server device 102 may include one or more I/O interfaces 206 to enable components or modules of the service provider server device 102 to control, interface with, or otherwise communicate with the I/O device(s) 204. The I/O interface(s) 206 may enable information to be transferred in or out of the service provider server device 102, or between components of the service provider server device 102, through serial communication, parallel communication, or other types of communication. For example, the I/O interface(s) 206 may comply with a version of the RS-232 standard for serial ports, or with a version of the Institute of Electrical and Electronics Engineers (IEEE®) 1284 standard for parallel ports. As another example, the I/O interface(s) 206 may be configured to provide a connection over Universal Serial Bus (USB) or Ethernet. In some cases, the I/O interface(s) 206 may be configured to provide a serial connection that is compliant with a version of the IEEE 1394 standard. The service provider server device 102 may also include one or more busses or other internal communications hardware or software that allow for the transfer of data between the various modules and components of the service provider server device 102.

The service provider server device 102 may include one or more network interfaces 208 that enable communications between the service provider server device 102 and other networked devices, such as the data tracking server device 114 and the audit data storage 112. The network interface(s) 208 may include one or more network interface controllers (NICs) or other types of transceiver devices configured to send and receive communications over a network.

The service provider server device 102 may include one or more memories, described herein as memory 210. The memory 210 comprises one or more computer-readable storage media (CRSM). The CRSM may include one or more of an electronic storage medium, a magnetic storage medium, an optical storage medium, a quantum storage medium, a mechanical computer storage medium, and so forth. The memory 210 provides storage of computer-readable instructions, data structures, program modules, and other data for the operation of the service provider server device 102.

The memory 210 may include an operating system (OS) module 212. The OS module 212 is configured to manage hardware resources such as the I/O device(s) 204, the I/O interface(s) 206, and the network interface(s) 208, and to provide various services to applications, processes, or modules executing on the processor(s) 202. The OS module 212 may include one or more of the following: any version of the Linux® operating system originally released by Linus Torvalds; any version of iOS™ from Apple Corp.® of Cupertino, Calif., USA; any version of Windows® or Windows Mobile® from Microsoft Corp.® of Redmond, Wash., USA; any version of Android® from Google Corp.® of Mountain View, Calif., USA and its derivatives from various sources; any version of Palm OS® from Palm Computing, Inc.® of Sunnyvale, Calif., USA and its derivatives from various sources; any version of BlackBerry OS® from Blackberry Ltd.® of Waterloo, Ontario, Canada; any version of VxWorks® from Wind River Systems® of Alameda, Calif., USA; or other operating systems.

The memory 210 may include the service module(s) 106 and the audit data collection module 108, as described above with reference to FIG. 1. The memory 210 may also include one or more other modules 214, such as a user authentication module or an access control module to secure access to the service provider server device 102, and so forth.

The memory 210 may include data storage 216 to store data for operations of the service provider server device 102. The data storage 216 may comprise a database, array, structured list, tree, or other data structure, and may be a relational or a non-relational datastore. The data storage 216 may include any type of data storage system, such as those listed above with reference to the audit data storage 112. The data storage 216 may store the data object(s) 104. The data storage 216 may store the data object transfer recording data 110. The data storage 216 may also store other data 218, such as user authentication information or access control data. In some implementations, at least a portion of the information stored in the data storage 216 may be stored externally to the service provider server device 102, on other devices that are accessible to the service provider server device 102 via the I/O interface(s) 206 or via the network interface(s) 208.

Figure 3:
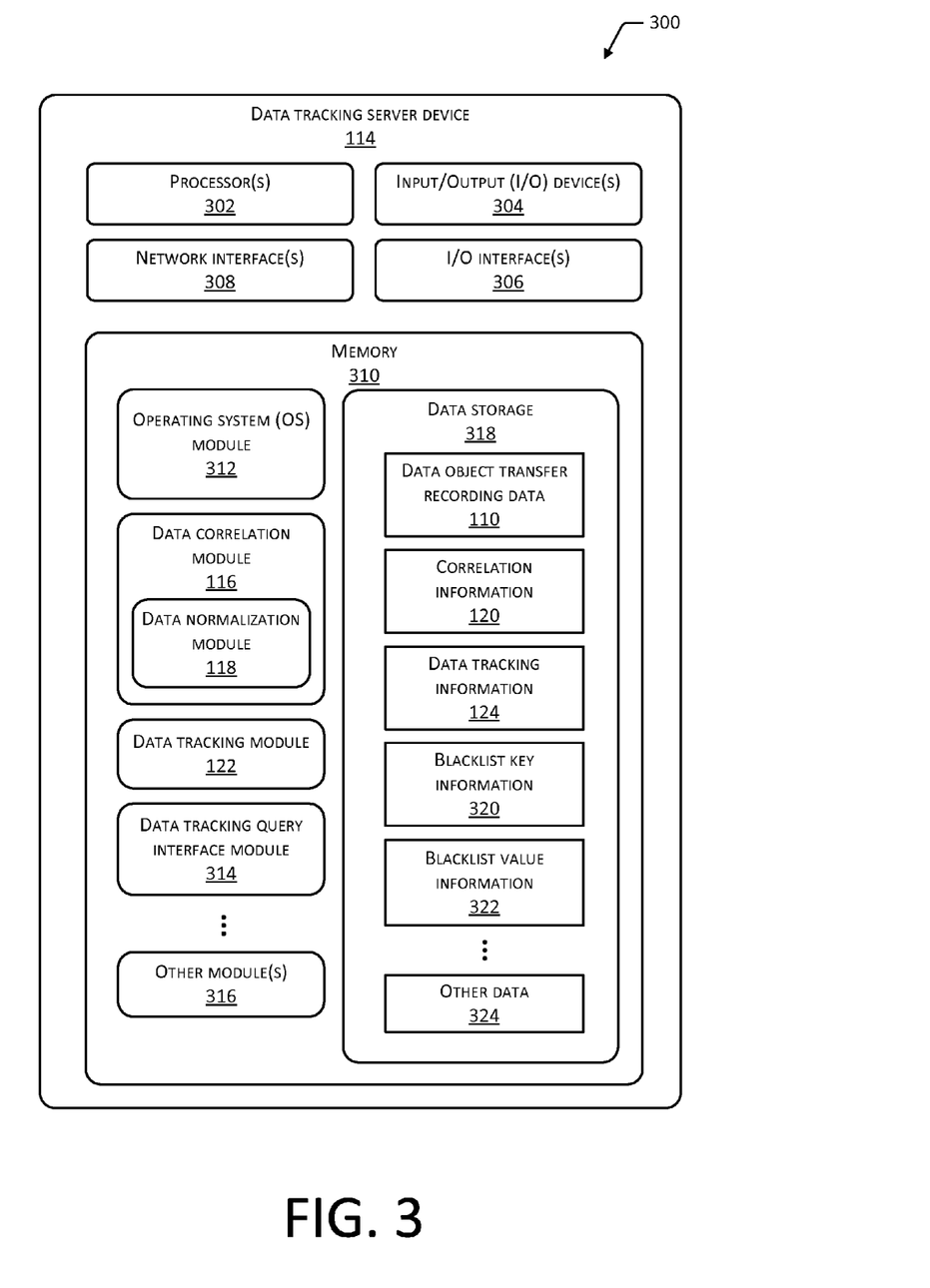
FIG. 3 depicts a block diagram of an example data tracking server device configured to analyze data object transfer recording data, identify correlations in the transferred data, and identify relationships between services based on the correlations.

FIG. 3 depicts a block diagram 300 of an example data tracking server device 114 configured to analyze the data object transfer recording data 110, identify correlations in the transferred data objects 104, and identify relationships between service modules 106 based on the correlations. As shown in the block diagram 300, the data tracking server device 114 may include one or more processors 302 configured to execute one or more stored instructions. The processor(s) 302 may comprise one or more cores. The data tracking server device 114 may include one or more I/O devices 304, one or more I/O interfaces 306, and one or more network interfaces 308 as described above with reference to the I/O device(s) 204, the I/O interface(s) 206, and the network interface(s) 208 respectively.

The data tracking server device 114 may include one or more memories, described herein as memory 310. The memory 310 comprises one or more CRSM. The CRSM may include one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the data tracking server device 114. The memory 310 may include an operating system (OS) module 312. The OS module 312 is configured to manage hardware resources such as the I/O device(s) 304, the I/O interface(s) 306, and the network interface(s) 308, and to provide various services to applications, processes, or modules executing on the processor(s) 302. The OS module 312 may include one or more of the operating systems described above with reference to OS module 212.

The memory 310 may include the data correlation module 116 and the data normalization module 118, which may perform operations as further described with reference to FIG. 7. As shown in the example of FIG. 3, the data normalization module 118 may execute as a sub-component or sub-module of the data correlation module 116. In some implementations, the data normalization module 118 may execute as a separate module. The memory 310 may also include the data tracking module 122, which may perform operations as further described with reference to FIGS. 8 and 9.

In some implementations, the memory 310 may include a data tracking query interface module 314. The data tracking query interface module 314 may enable a user to input a query including one or more query parameters to request tracking or origin information for one or more data objects 104. The data tracking query interface module 314 may also display information describing the data tracking information 124 for one or more data objects 104, such as an origin system or origin service for one or more data objects 104. The data tracking query interface module 314 may provide any type of user interface. For example, the data tracking query interface module 314 may provide a command line interface configured to receive text-based queries from a user, and to provide textual output describing the data tracking information 124. Alternatively, the data tracking query interface module 314 may provide a graphical user interface (GUI) configured to receive text input as well as commands entered via any number of controls, and to provide textual, graphical, or other types of output describing the data tracking information 124.

The memory 310 may also include one or more other modules 316, such as a user authentication module or an access control module to secure access to the data tracking server device 114, and so forth.

The memory 310 may include data storage 318 to store data for operations of the data tracking server device 114. The data storage 318 may comprise a database, array, structured list, tree, or other data structure, and may be a relational or a non-relational datastore. The data storage 318 may include any type of data storage system, such as those listed above with reference to the audit data storage 112. The data storage 318 may store one or more of the data object transfer recording data 110, the correlation information 120, or the data tracking information 124.

In some implementations, the data correlation module 116 may ignore certain key-value pairs when determining the correlation information 120. For example, certain keys may be frequently associated with a same value even though the services associated with those keys may not be involved in a transfer of the same data objects 104. To avoid false positives in the analysis, such keys may be added to a blacklist and ignored during the generation of the correlation information 120. In such cases, the data storage 318 may store blacklist key information 320 that describes one or more blacklisted keys to be ignored during processing.

In some cases, software developers may employ certain placeholder or default values for a data attribute when writing source code. For example, a developer may hard-code or otherwise incorporate into source code certain placeholder or default values such as 0, 1, null, or a maximum or minimum value for a particular data attribute. In such cases, keys in the data object transfer recording data 110 may share common values even though the service modules 106 associated with the keys may not communicate data objects 104 with one another. In other words, keys may share a value that is an artifact of the software development process and that may not indicate services communicating a data object 104. Accordingly, in some implementations the data storage 318 may store blacklist value information 322 that describes one or more blacklisted values such as those listed above, and the correlation information 120 may not be updated for a pair of candidate keys that are associated with one of the predetermined set of values included in the blacklist value information 322.

The data storage 318 may also store other data 324, such as user authentication information or access control data. In some implementations, at least a portion of the information stored in the data storage 318 may be stored externally to the data tracking server device 114, on other devices that are accessible to the data tracking server device 114 via the I/O interface(s) 306 or via the network interface(s) 308.

Although FIG. 3 depicts a single data tracking server device 114 that executes the data correlation module 116 and the data tracking module 122, implementations are not so limited. In some implementations, multiple data tracking server devices 114 may operate in a cluster, server farm, or otherwise, to perform the operations described herein for data tracking. For example, in some implementations the data correlation module 116 may execute on a first data tracking server device 114, and the data tracking module 122 may execute on a second data tracking server device 114.

Figure 4:
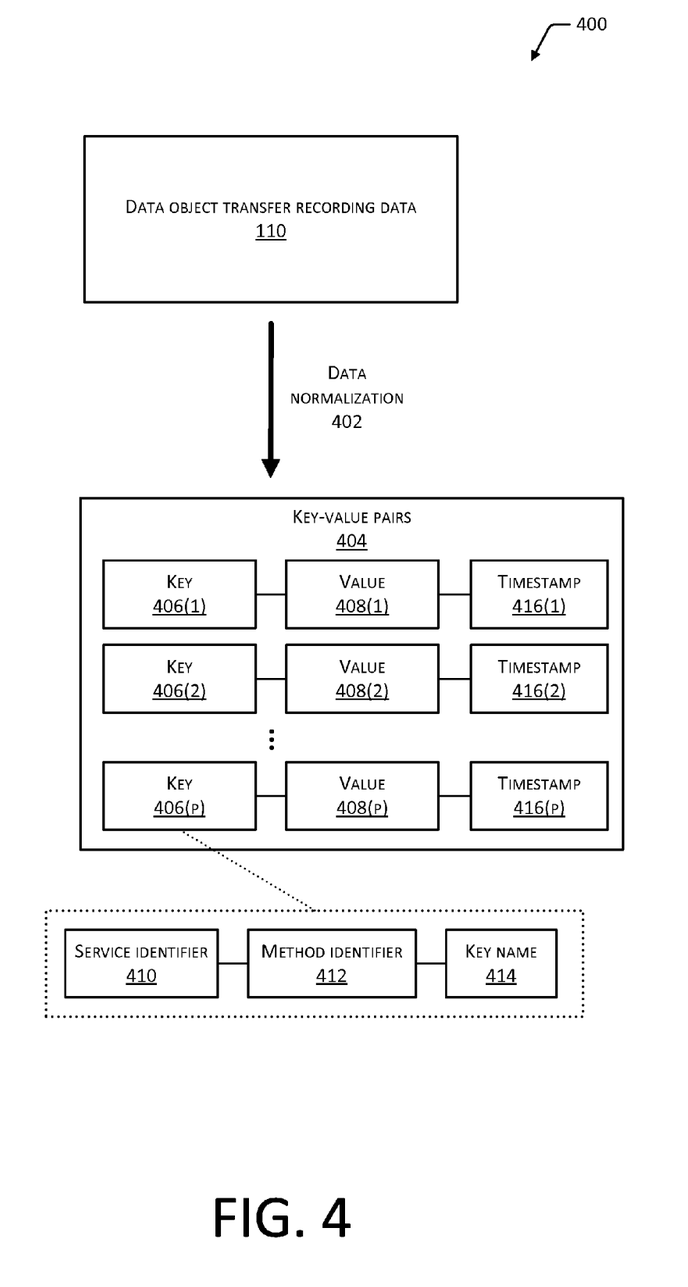
FIG. 4 depicts a schematic of an example format for key-value pair information that is determined based on a normalization of data object transfer recording data.

FIG. 4 depicts a schematic 400 showing an example format for key-value pair information that is determined based on a normalization of the data object transfer recording data 110. Through data normalization 402, one or more key-value pairs 404 may be determined based on the data object transfer recording data 110. In some implementations, the data normalization 402 may include one or more operations performed by data normalization module 118. The data normalization 402 may be described as a flattening of the data object transfer recording data 110 to generate a flattened, reduced, or redacted version of the data object transfer recording data 110 that includes the one or more key-value pairs 404. In some cases, the data normalization 402 may generate a redacted version of the data object transfer recording data 110 that may consume less memory when stored, and that may be analyzed more efficiently than the original, un-redacted data object transfer recording data 110.

As shown in FIG. 4, each of the key-value pairs 404 includes a key 406 and a value 408. In some cases, the key 406 may correspond to a data attribute included in a transferred data object 104, and the value 408 may include any type of data that is stored in the data attribute. For example, a key 406 for a data attribute "ProductID" may be associated with a value 408 of "123456789," which may be an identifier or stock-keeping unit (SKU) for a particular product. In some implementations, the data normalization 402 may include removing duplicate instances of key-value pairs 404.

In some implementations, the key 406 may be a composite key that includes multiple portions describing different aspects of the key 406. For example, as shown in FIG. 4, the key 406 may include a service identifier 410, a method identifier 412, and a key name 414. The service identifier 410 may identify a particular service module 106 that participates in the transfer of the data object 104 described by the data object transfer recording data 110. The method identifier 412 may identify a particular method or function of an API provided by the service module 106. The key name 414 may identify a data attribute included in the method or function. In some implementations, one or more of the service identifier 410, the method identifier 412, or the key name 414 may be included in the key 406, and separated by a designated separator character such as a period, semicolon, colon, and so forth. For example, a key 406 may be "orderstor.loadorder.itemID", where "orderstor" is the service identifier 410, "loadorder" is the method identifier 412, and "itemID" is the key name 414. Other examples of key-value pairs 404 are described with reference to FIG. 6.

In some implementations, each of the key-value pairs 404 may be associated with a timestamp 416. The timestamp 416 may be determined based on information included in the data object transfer recording data 110, and may indicate a date and time when the data object 104 was created, edited, modified, or transferred. In some implementations, the data normalization 402 may include determining the timestamp 416 from the data object transfer recording data 110, and associating the timestamp 416 with the key-value pair 404.

Figure 5:
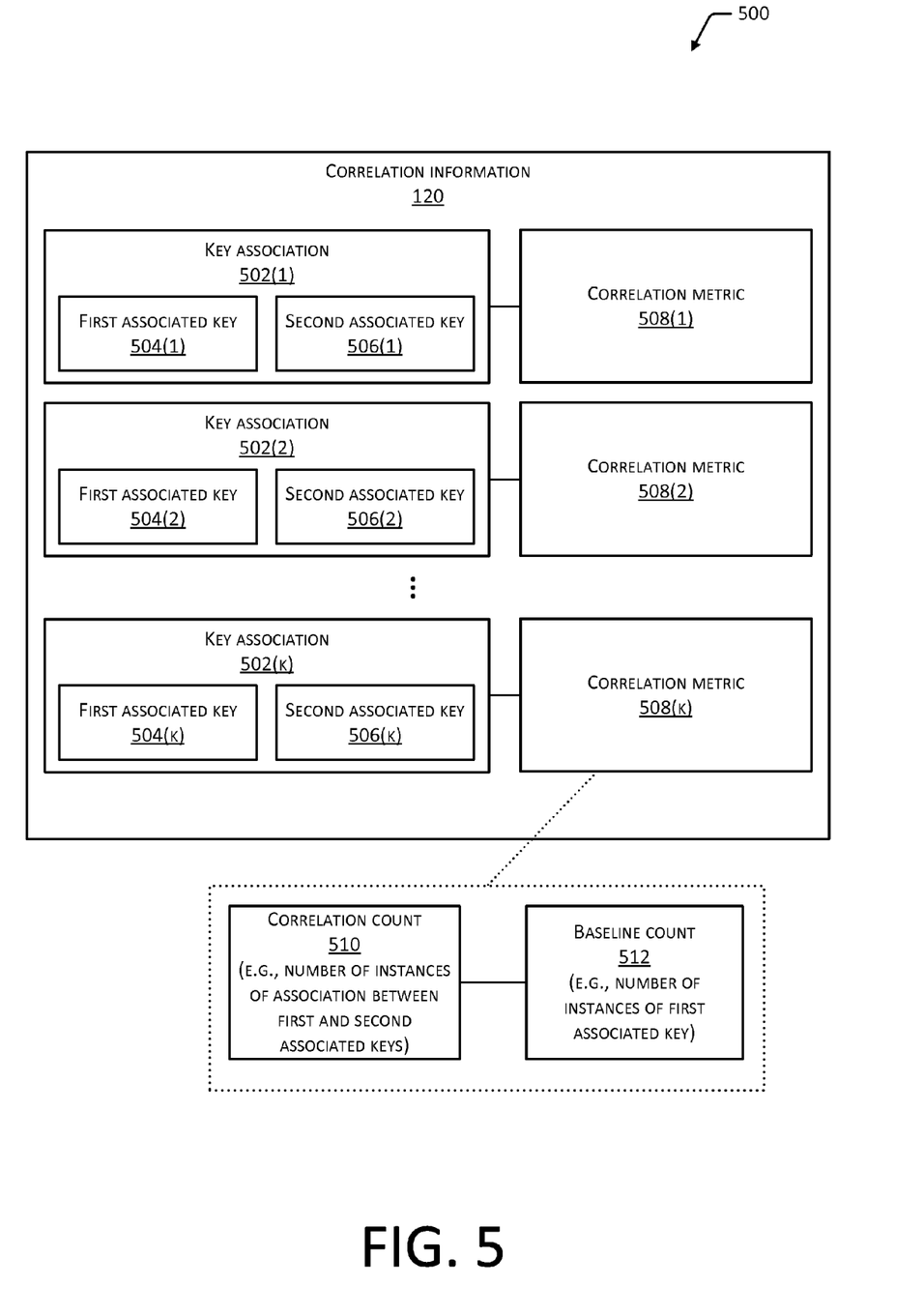
FIG. 5 depicts a schematic of an example format for correlation information, including key associations and correlation metrics corresponding to the key associations.

FIG. 5 depicts a schematic 500 showing an example format for the correlation information 120, including one or more key associations 502. Each key association 502 includes a first associated key 504 and a second associated key 506. Each key association 502 may be associated with a correlation metric 508, which describes a level of association between the first associated key 504 and the second associated key 506. In some implementations, the correlation metric 508 may include a correlation count 510 that describes the number of instances in which the first associated key 504 and the second associated key 506 were found to be associated through a same or substantially similar value in the data object transfer recording data 110. Accordingly, the data correlation module 116 may increment the correlation count 510 for a particular key association 502 when the data correlation module 116 identifies an instance where the first associated key 504 and the second associated key 506 have a same or substantially similar value. The correlation metric 508 may also include a baseline count 512, indicating a number of instances of the first associated key 504 in the data object transfer recording data 110. Some implementations may process the correlation count 510 and the baseline count 512, including dividing the correlation count 510 by the baseline count 512 to determine a correlation percentage for the key association 502. For example, the correlation percentage may indicate the percentage of instances of the first associated key 504 in which the first associated key 504 is associated with the second associated key 506 through a shared value.

Although FIG. 5 depicts the correlation information 120 as a flat table of key associations 504, implementations are not so limited. In some implementations, the correlation information 120 may be arranged as a tree structure in which the first associated key 504 is a parent node relative to one or more child nodes that each correspond to a second associated key 506. In such cases, the correlation count 510 may be associated with the child node, and may indicate a number of instances of association between the first associated key 504 and the second associated key 506. The baseline count 512 may be associated with the parent node, and may indicate a number of instances of the first associated key 504.

In some implementations, the data objects 104 may be encrypted for transfer between service modules 106, and at least a portion of the data object transfer recording data 110 may also be encrypted. Such encryption may protect potentially sensitive, personal, or private information (e.g., credit card numbers, bank account numbers, personal identification information, and so forth) that may be included in the values of one or more of the key-value pairs 404. At least a portion of the data object transfer recording data 110 may be decrypted prior to the processing that determines the correlation information 120. In such cases, the key association(s) 502 included in the correlation information 120 may be stored in an unencrypted form. Because the key association(s) 502 indicate a frequency at which pairs of keys share a same or substantially similar value, but may not indicate the particular value that is shared or substantially similar, the key association(s) 502 and other correlation information 120 may be stored in an unencrypted form without comprising the security of sensitive, personal, or private information.

Figure 6:
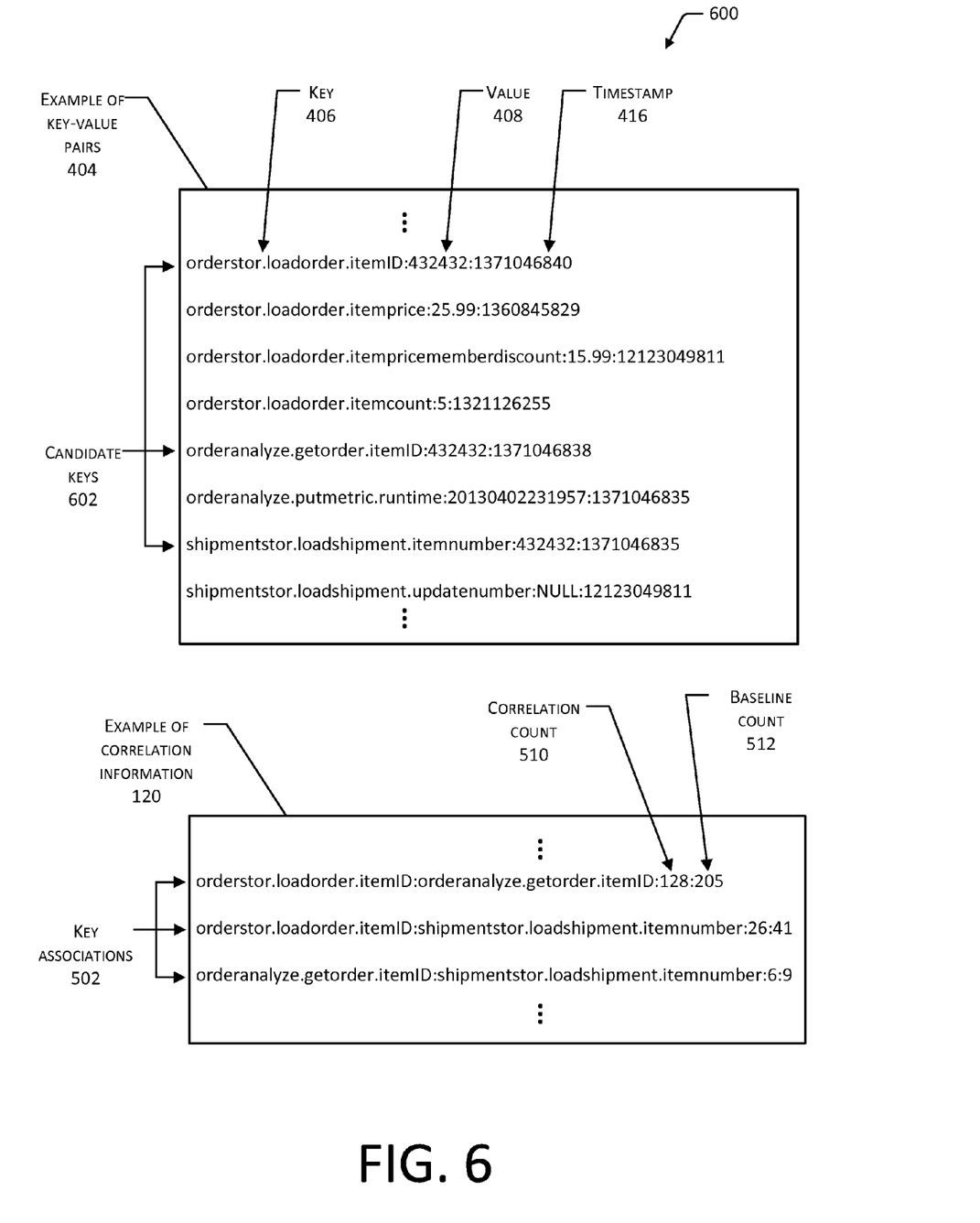
FIG. 6 depicts a schematic of example key-value pairs and example correlation information.

FIG. 6 depicts a schematic 600 of example key-value pairs 404 and example correlation information 120. In this example, each of the key-value pairs 404 includes the key 406, the value 408, and the timestamp 416. As described above, the timestamp 416 describes the time, the date, or both the time and the date when the data object 104 associated with the key-value pair 404 was created, edited, modified, or transferred. Implementations support any format for the timestamp 416. In this example, the key 406, the value 408, and the timestamp 416 are separated in the key-value pairs 404 by a separator character that is a colon. Implementations support other separator characters to delimit and separate the information in the key-value pairs 404. Moreover, although the example of FIG. 6 depicts the key-value pairs 404 as including the key 406, the value 408, and the timestamp 416 in a particular order, implementations are not so limited. Implementations support any order, format, or arrangement of information within the key-value pairs 404.

The example key-value pairs 404 may be analyzed by the data correlation module 116, and two or more candidate keys 602 may be identified as having a same or substantially similar value. In this example, three candidate keys 602 have been identified as having the same value "432432": "orderstor.loadorder.itemID", "orderanalyze.getorder.itemID", and "shipmentstor.loadshipment.itemnumber". In some cases, the criteria for identifying candidate keys 602 may be based on what type of data is stored in the keys 406. For example, in cases where keys 406 store discrete values 408 such as shipment or order identifiers, user identifiers, product identifiers, and so forth, keys 406 may be designated as candidate keys 602 if their values are the same. Alternatively, in cases where keys 406 store non-discrete values such as prices, costs, time intervals, or other continuously variable values 408, keys 406 may be designated as candidate keys 602 if their values 408 are the same or are substantially similar, e.g., within a predetermined threshold range. For example, values 408 that are within a range that is plus or minus 5% or 10% of the value 408 may be designated as candidate keys 602.

For a set of candidate keys 602, each pair of keys 406 within the set may be identified. For each pair of keys 406, the correlation information 120 may be examined to determine whether the correlation information 120 includes a key association 502 for the pair of keys 406. If not, a new key association 502 may be added to the correlation information 120, with a corresponding correlation metric 508 indicating one instance of association between the keys 406, e.g., a correlation count of 1. If the correlation information 120 already includes a key association 502 for the pair of keys 406, the corresponding correlation metric 508 may be updated to indicate an additional instance of association between the keys 406. For example, the correlation count may be incremented.

In the example of FIG. 6, three candidate keys 602 have been identified within the key-value pairs 404 as sharing a same value "432432", the three candidate keys 602 being "orderstor.loadorder.itemID", "orderanalyze.getorder.itemID", and "shipmentstor.loadshipment.itemnumber". Among the three candidate keys 602, three possible pairs of keys may be identified: a first pair "orderstor.loadorder.itemID" and "orderanalyze.getorder.itemID"; a second pair "orderstor.loadorder.itemID" and "shipmentstor.loadshipment.itemnumber"; and a third pair "orderanalyze.getorder.itemID" and "shipmentstor.loadshipment.itemnumber". The key association 502 for each of these pairs of keys 406 in the correlation information 120 may be identified, and the corresponding correlation metric 508 may be incremented or otherwise updated to indicate an additional instance of association between the keys 406. If a key association 502 for each of the pairs of keys 406 is not already present in the correlation information 120, a key association 502 may be added to the correlation information 120 with a corresponding correlation metric 508 indicating one instance of association.

In some implementations, the correlation information 120 may also store, for each key 406, information describing a total number of instances of the key 406 in the data object transfer recording data 110. In such cases, the correlation metric 508 may be expressed as a percentage or proportion of the total number of instances of the key 406. For example, a key A may have occurred 50 times in the data object transfer recording data 110, and a key association 502 between key A and key B may have a correlation count of 12. Accordingly, the correlation metric 508 may indicate that key A is associated with key B in 24% of the instances in which key A appears in the data object transfer recording data 110.

Figure 7:
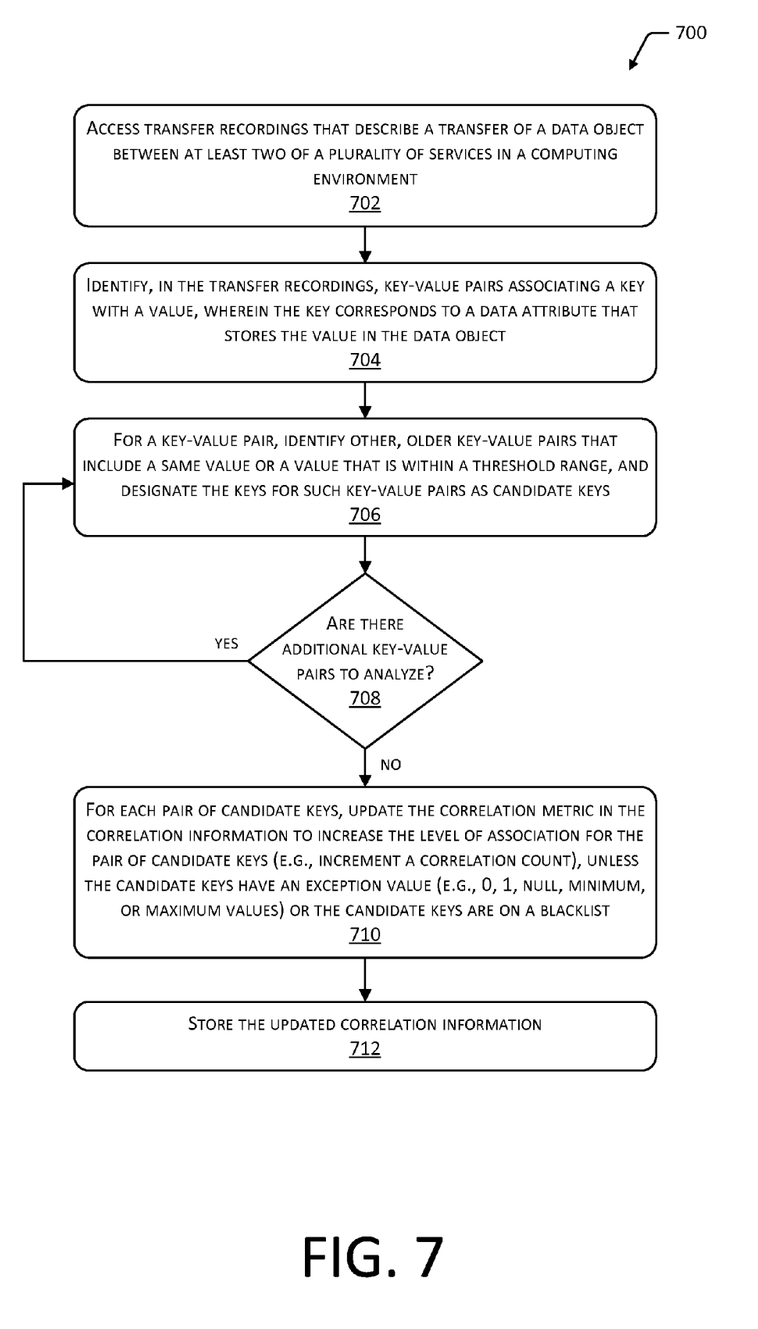
FIG. 7 depicts a flow diagram of a process for creating or updating correlation information based on an identification of keys that share a same value within data object transfer recording data.

FIG. 7 depicts a flow diagram 700 of a process for creating or updating the correlation information 120 based on an identification of keys 406 that share a same value 408 within the data object transfer recording data 110. The process includes operations that may be performed by the data correlation module 116, the data normalization module 118, or other modules executing on the data tracking server device 114 or on other computing devices.

At 702, one or more transfer recordings may be accessed from the data object transfer recording data 110 stored in the audit data storage 112. In some implementations, transfer recordings may be accessed that describe the transfer of one or more particular data objects 104 that are associated with object identifiers. Alternatively, transfer recordings may be accessed that describe the transfer of a single data object 104 between services. For example, transfer recordings associated with a particular shipment object or order object may be accessed by querying the audit data storage 112 for a particular shipment identifier or order identifier. Implementations also support other methods of selecting transfer recordings for analysis, including selecting a random sample of the transfer recordings stored in the audit data storage 112. In some cases, the data objects 104, the data object transfer recording data 110, or both may be at least partly encrypted. In such cases, the data object transfer recording data 110 may be decrypted at 702 prior to further operations of the process.

At 704, the transfer recordings are analyzed to identify one or more key-value pairs 404 that each includes a key 406 and a value 408 associated with the key 406. As described above, the key 406 may correspond to a data attribute that stores the value 408 in the data object 104 described by a transfer recording. In some implementations, the identification of key-value pairs 404 in the transfer recordings may be performed as part of the data normalization 402, in which the transfer recordings are flattened, redacted, reduced, or otherwise processed into a set of key-value pairs 404.

At 706, for one of the key-value pairs 404, other key-value pairs 404 may be identified that include a same value 408, or a substantially similar value 408 within a predetermined threshold range as described above. Each pair of keys 406 that are associated with a same or substantially similar value may be designated as candidate keys 602. In some implementations, the analysis performed at 706 for a particular key-value pair 404 may identify older key-value pairs 404 that include a same or substantially value, based on the timestamp 416 associated with each key-value pair 404.

At 708, a determination is made whether there are additional key-value pairs 404 to analyze. If so, the process may return to 706 and identify other key-value pairs 404 that are associated with a same value 408 or a substantially similar value 408. If not, the process may proceed to 710.

At 710, the set of candidate keys 602 may be analyzed and each possible pair of candidate keys 602 may be determined as described above with reference to FIG. 6. The possible pairs of candidate keys 602 may be determined based on a combinatorial algorithm that chooses each unique pair of candidate keys 602 from the set of candidate keys 602. For example, if a set of candidate keys 602 includes keys A, B, C, and D, the possible pairs of candidate keys 602 may include A and B, A and C, A and D, B and C, B and D, and C and D. For each pair of candidate keys 602, the correlation information 120 may be examined to determine whether the correlation information 120 includes a key association 502 for the pair of candidate keys 602. If not, a new key association 502 may be added to the correlation information 120, with a corresponding correlation metric 508 indicating one instance of association between the candidate keys 602, e.g., a correlation count of 1. If the correlation information 120 already includes a key association 502 for the pair of candidate keys 602, the corresponding correlation metric 508 may be updated to indicate an additional instance of association between the candidate keys 602, e.g., the correlation count may be incremented.

In some cases, software developers may employ certain placeholder or default values for a data attribute when writing source code. For example, a developer may hard-code or otherwise incorporate into source code certain placeholder or default values such as 0, 1, null, or a maximum or minimum value for a particular data attribute. In such cases, keys 406 in the data object transfer recording data 110 may share common values 408 even though the service modules 106 associated with the keys 406 may not communicate data objects 104 with one another. In other words, keys 406 may share a value 408 that is an artifact of the software development process and that may not indicate services communicating a data object 104. Accordingly, in some implementations at 710 the correlation information 120 may not be updated for a pair of candidate keys 602 that are associated with one of a predetermined set of values 408 such as those listed above.

Moreover, in some cases certain pairs of keys 406 may be frequently associated with a same value 408 even though the service modules 106 associated with those keys 406 may not be involved in a transfer of the same data objects 104. To avoid false positives in the analysis, certain keys 406 may be included in a blacklist such as the blacklist key information 320. Keys 406 included on the blacklist may be at least partly ignored during the update of the correlation information 120 at 710.

The process may continue to analyze the transfer recordings, analyze the key-value pairs 404 present in the transfer recordings, and update the correlation information 120 for each pair of keys 406 that are associated with a same or substantially similar value 408. At 712, the updated correlation information 120 may be stored in memory on the data tracking server device 114 or elsewhere. The correlation information 120 may then be employed by the data tracking module 122 or another module to determine a path followed by a particular data object 104 as it is transferred among the service modules 106. Implementations for employing the correlation information 120 to track data flow are described further with reference to FIGS. 8 and 9.

Figure 8:
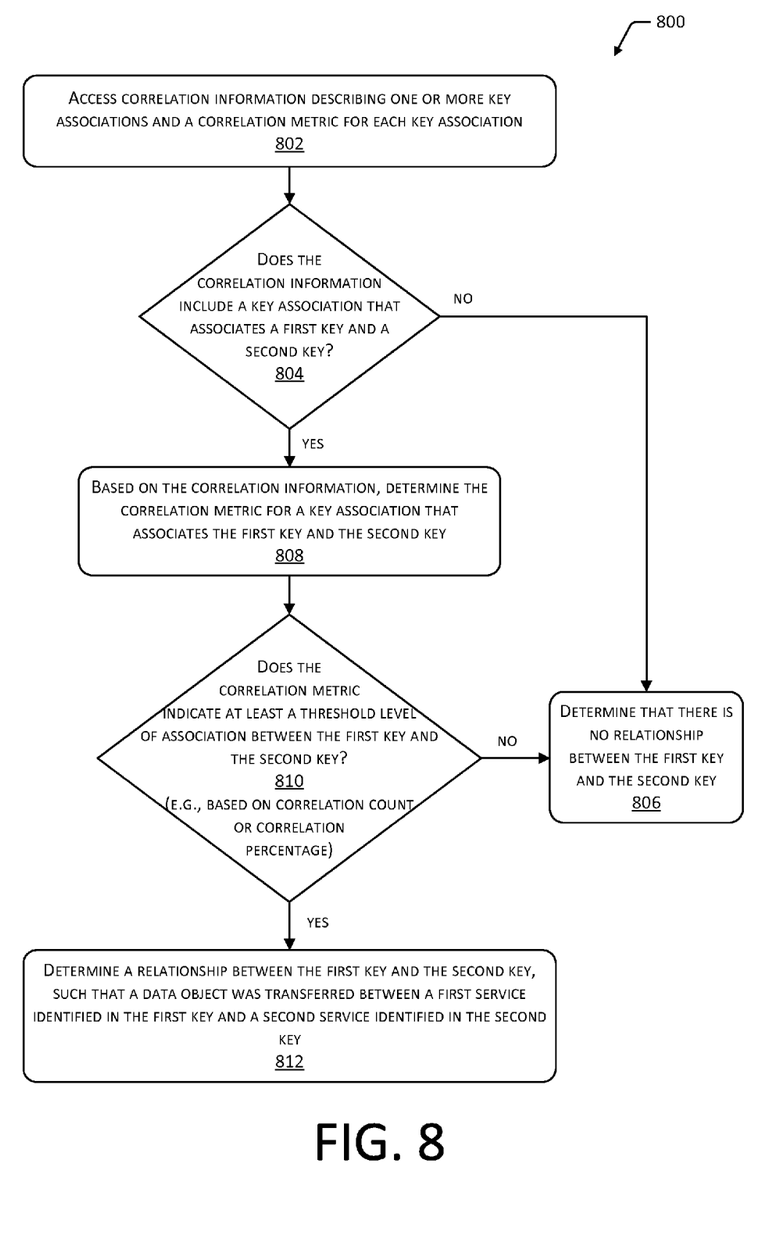
FIG. 8 depicts a flow diagram of a process for employing the correlation information to determine a relationship between services corresponding to associated keys.

FIG. 8 depicts a flow diagram 800 of a process for employing the correlation information 120 to determine a relationship between service modules 106 corresponding to associated keys 406. The process includes operations that may be performed by the data tracking module 122, or other modules executing on the data tracking server device 114 or on other computing devices.

At 802, the correlation information 120 is accessed from memory on the data tracking server device 114 or elsewhere. As described above, the correlation information 120 may describe one or more key associations 502 and a correlation metric 508 corresponding to each key association 502. In some implementations, the correlation information 120 accessed at 802 includes at least a portion of the correlation information that was generated based on transfer recordings describing the transfer of a particular data object 104.

At 804, a determination is made whether the correlation information 120 includes a key association 502 that associates a particular pair of keys 406, such as a first key 406(1) and a second key 406(2). If not, the process may proceed to 806 and determine that there is no relationship between the service modules 106 associated with the first key 406(1) and the second key 406(2). In such cases, an inference may be made that the service modules 106 associated with the first and second keys 406 do not participate in the transfer of the same data objects 104. If it is determined at 804 that the correlation information 120 includes a key association 502 for the first and second keys 406, then the process may proceed to 808 and retrieve or otherwise determine the correlation metric 508 for the key association 502 between the first and second keys 406.

At 810, a determination is made whether the correlation metric 508 indicates at least a predetermined threshold level of association between the first and second keys 406. In some implementations, the threshold level of association may be a predetermined number of instances of association, such as 10. Alternatively, the threshold level of association may be a predetermined threshold correlation percentage of instances of association relative to a total number of instances of a key 406. For example, a predetermined correlation threshold percentage of 50% may be met if a particular key A is associated with a key B at least half the time that key A appears in the data object transfer recording data 110.

If it is determined at 810 that the correlation metric 508 does not indicate at least the threshold level of association, the process may proceed to 806 and determine that there is no relationship between the service modules 106 associated with the first and second keys 406. Otherwise, the process may proceed to 812, and infer or determine a relationship between the service modules 106 associated with the first and second keys 406. The inferred relationship may indicate that the service modules 106 associated with the first and second keys 406 are involved in a transfer of a data object 104. The data tracking information 124 may be updated to describe a transfer relationship between the service modules 106 associated with the first and second keys 406. In some implementations, the key-value pair 404 having the highest correlation count for a particular first associated key 504 may be indicative of a relationship between the first and second associated keys in the key-value pair 404.

Figure 9:
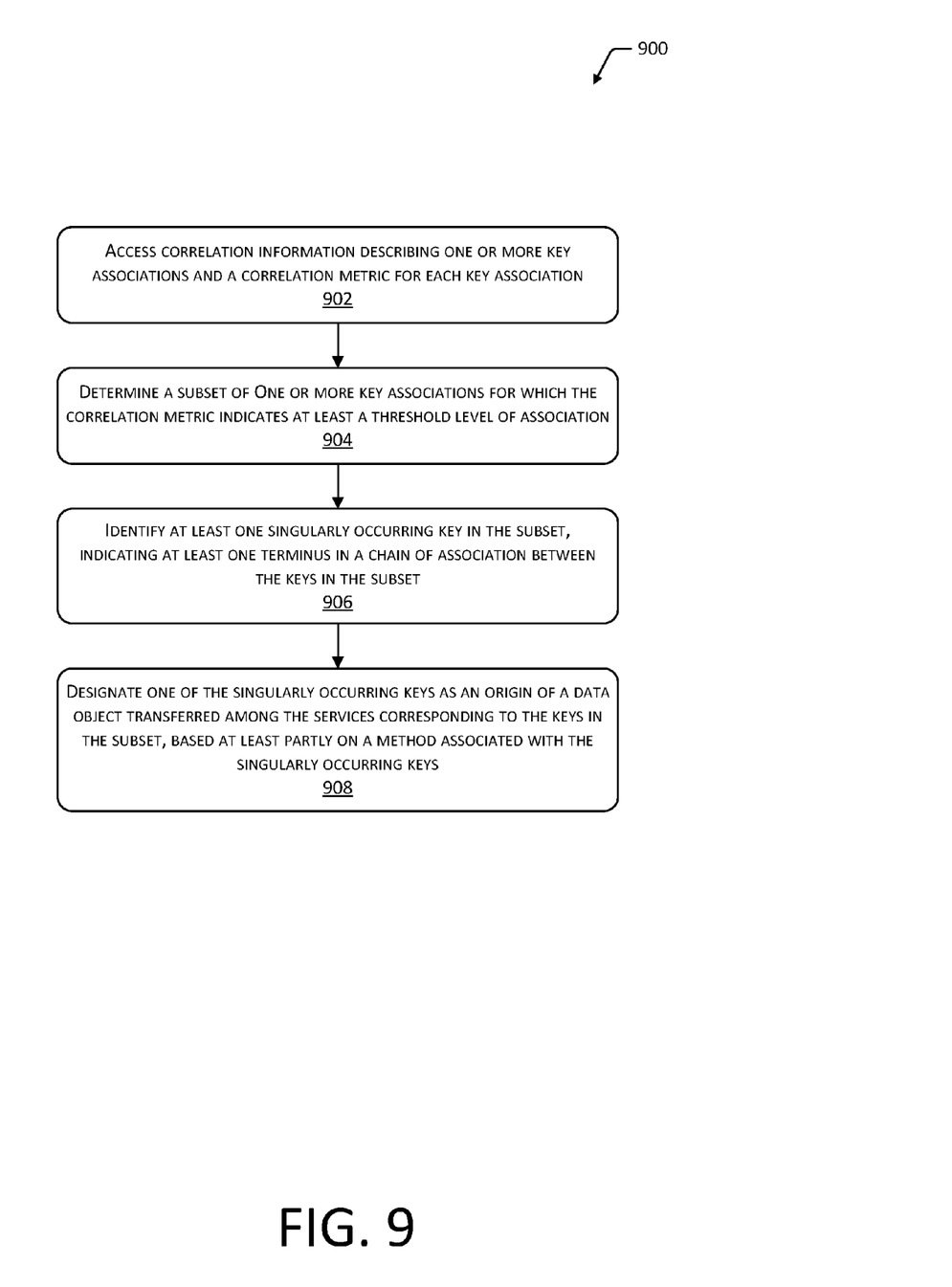
FIG. 9 depicts a flow diagram of a process for employing the correlation information to determine relationships between multiple keys, and identify an origin of a data object transferred among services corresponding to the keys.

FIG. 9 depicts a flow diagram 900 of a process for employing the correlation information 120 to determine relationships between multiple keys 406, and identify an origin of a data object 104 transferred among service modules 106 corresponding to the keys 406. The process includes operations that may be performed by the data tracking module 122, or other modules executing on the data tracking server device 114 or on other computing devices.

At 902, the correlation information 120 is accessed from memory on the data tracking server device 114 or elsewhere. As described above, the correlation information 120 may describe one or more key associations 502 and a correlation metric 508 corresponding to each key association 502. In some implementations, the correlation information 120 accessed at 902 includes at least a portion of the correlation information that was generated based on transfer recordings describing the transfer of a particular data object 104.

At 904, a determination is made of a subset of the one or more key associations 502 included in the correlation information 120, for which the correlation metric 508 indicates at least a threshold level of association as described above with reference to FIG. 8.

At 906, an identification is made of at least one singularly occurring key 406 in the subset of key associations 502 determined at 904. Because the correlation information 120 accessed at 902 is associated with a particular data object 104, each key 406 in the subset of key associations 502 may occur either once or twice in the subset. Keys 406 that occur twice may indicate services that acted as a pass-through for a data object 104, such that the key 406 is involved in both an incoming transfer and an outgoing transfer. Keys 406 that occur once in the subset may indicate services that acted as a terminus in the path followed by a data object 104, wherein a terminus may be either an origin service or a final destination service in a chain of transfer. Accordingly, an inference may be made that a singularly occurring 406 key in the subset corresponds to either the service module 106 that originated the data object 104, or the service module 106 that was the last to receive the data object 104.

At 908, one of the singularly occurring keys 406 may be designated as an origin of the data object 104 transferred among the service modules 106 corresponding to the keys 406 in the subset. In some implementations, this designation may be based at least partly on the method identifier 412 included in the singularly occurring key 406. In some cases, methods may be descriptively named to describe an operation performed by the method, such as a get operation, a put operation, a set operation, and so forth. Accordingly, an analysis or examination of the method identifier 412 may enable an inference that a particular method was involved in the origination of a data object 104. The data tracking information 124 may be updated to describe the origin service module 106 for the data object 104.

In some implementations, one or more of the data object transfer recording data 110, the correlation information 120, or the data tracking information 124 may be associated with a timeout period or a time-to-live (TTL) characteristic. In such cases, a process may periodically execute to purge or delete at least a portion of the data object transfer recording data 110, the correlation information 120, or the data tracking information 124 that is older than a particular threshold age. Such periodic deletion may enable implementations to regenerate correlation information 120 or data tracking information 124 based on recent data object transfer recording data 110, ensuring that the correlation information 120 and data tracking information 124 reflects a substantially current set of relationships between the service modules 106 executing in the computing environment 100.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors.

Separate instances of these programs may be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method executed on at least one processor, the method comprising:

accessing transfer recordings that describe a transfer of a data object between at least two of a plurality of services in a computing environment;

identifying, in the transfer recordings, key-value pairs associating a key with a value, wherein the key corresponds to a data attribute that stores the value in the data object, and wherein the key includes:

a service identifier corresponding to a service of the plurality of services, the service participating in the transfer of the data object;

a method identifier corresponding to a method provided by the service, the method participating in the transfer of the data object; and a key name corresponding to the data attribute included in the data object;

identifying a plurality of candidate keys corresponding to a same value in the key-value pairs;

accessing correlation information that describes:

a plurality of key associations between pairs of keys; and a correlation count of a number of instances of association between each of the pairs of keys;

for each pair of candidate keys in the plurality of candidate keys, updating the correlation information to increment the correlation count for one of the plurality of key associations that associates the pair of candidate keys; and storing the updated correlation information.

2. The method of claim 1 as executed on the at least one processor, further comprising:

accessing the correlation information to determine the correlation count for one of the plurality of key associations that associates a first key and a second key;

determining a correlation percentage, based at least partly on a ratio of the correlation count to a number of instances of the first key in the transfer recordings; and determining a relationship between the first key and the second key based at least partly on the correlation percentage being at least a threshold correlation percentage, the relationship including at least one of:

a first service transferring the data object to a second service; or the second service transferring the data object to the first service, wherein the first service corresponds to a first service identifier included in the first key, and wherein the second service corresponds to a second service identifier included in the second key.

3. The method of claim 1 as executed on the at least one processor, further comprising:

accessing the correlation information to determine a subset of the plurality of key associations for which the correlation count is at least a threshold correlation count;

identifying a singularly occurring key in the subset of the plurality of key associations; and designating, as an origin of the data object, the service corresponding to the service identifier included in the singularly occurring key.

4. The method of claim 1 as executed on the at least one processor, wherein the data object includes data for at least one of a product shipment or a product order being processed in the computing environment.

5. A system, comprising:

at least one memory storing computer-executable instructions, and correlation information comprising:

a plurality of key associations between pairs of keys that correspond to data attributes in data objects transferred among a plurality of services in a computing environment; and a correlation metric indicating a level of association between each of the pairs of keys; and at least one processor in communication with the at least one memory, the at least one processor configured to access the at least one memory and execute the computer-executable instructions to:

access transfer recordings that describe a transfer of at least one of the data objects between at least two of the plurality of services;

identify, in the transfer recordings, key-value pairs associating a key with a value, wherein the key corresponds to a data attribute that stores the value in the data object;

identify a plurality of candidate keys in the key-value pairs, the plurality of candidate keys corresponding to values that are within a predetermined threshold range of each other;

for each pair of candidate keys in the plurality of candidate keys, update the correlation metric in the correlation information to increase the level of association between one of the plurality of key associations that associates the pair of candidate keys; and store the updated correlation information in the at least one memory.

6. The system of claim 5, wherein the key includes:

a service identifier corresponding to a service of the plurality of services, the service participating in the transfer of the at least one of the data objects; and a method identifier corresponding to a method provided by the service, the method participating in the transfer of the at least one of the data objects.

7. The system of claim 6, the at least one processor further configured to:

access the correlation information to determine the correlation metric for one of the plurality of key associations that associates a first key and a second key; and determine a relationship between the first key and the second key based at least partly on the correlation metric indicating at least a threshold level of association between the first key and the second key, the relationship including at least one of:

a first service transferring the at least one of the data objects to a second service; or the second service transferring the at least one of the data objects to the first service, wherein the first service corresponds to a first service identifier included in the first key, and wherein the second service corresponds to a second service identifier included in the second key.

8. The system of claim 6, the at least one processor further configured to:

access the correlation information to determine a subset of the plurality of key associations for which the correlation metric indicates at least a threshold level of association;

identify a singularly occurring key in the subset of the plurality of key associations; and designate, as an origin of the at least one of the data objects, the service corresponding to the service identifier included in the singularly occurring key.

9. The system of claim 5, wherein:

the correlation metric includes a correlation count indicating a number of instances of association between each of the pairs of keys; and the updating of the correlation metric includes incrementing the correlation count to indicate an additional instance of association between the one of the plurality of key associations that associates the pair of candidate keys.

10. The system of claim 5, wherein the identifying the plurality of candidate keys further comprises:

omitting, from the plurality of candidate keys, one or more pairs of keys having associated values that are within the predetermined threshold range of at least one of:
zero; one;
a null value;
a maximum value of the data attribute corresponding to the one or more pairs of keys; or
a minimum value of the data attribute corresponding to the one or more pairs of keys.

11. The system of claim 5, wherein the identifying the plurality of candidate keys further comprises:

omitting, from the plurality of candidate keys, one or more keys that are included in a blacklist of keys.

12. The system of claim 5, the at least one processor further configured to:

periodically delete at least a portion of the correlation information that is at least a predetermined threshold age.

13. The system of claim 5, wherein:

each of the data objects includes an object identifier; and the accessing the transfer recordings includes accessing the transfer recordings that describe the transfer of a data object that includes a designated object identifier.

14. The system of claim 5, wherein the at least one of the data objects includes data for at least one of a product shipment or a product order being processed in the computing environment.

15. One or more non-transitory computer-readable media storing instructions which, when executed by at least one processor, instruct the at least one processor to perform actions comprising:

accessing transfer recordings that describe a transfer of a data object between at least two of a plurality of services in a computing environment;

identifying, in the transfer recordings, key-value pairs associating a key with a value, wherein the key corresponds to a data attribute that stores the value in the data object, and further wherein the key includes:

a service identifier corresponding to a service of the plurality of services, the service participating in the transfer of the data object; and a method identifier corresponding to a method provided by the service, the method participating in the transfer of the data object;

identifying a plurality of candidate keys in the key-value pairs, the plurality of candidate keys corresponding to values that are within a predetermined threshold range of each other;

accessing correlation information comprising:

a plurality of key associations between pairs of keys that correspond to data attributes in data objects transferred among the plurality of services in the computing environment; and a correlation metric indicating a level of association between each of the pairs of keys; and for each pair of candidate keys in the plurality of candidate keys, updating the correlation metric in the correlation information to increase the level of association between one of the plurality of key associations that associates the pair of candidate keys.

16. The one or more non-transitory computer-readable media of claim 15, the actions further comprising:

accessing the correlation information to determine the correlation metric for one of the plurality of key associations that associates a first key and a second key; and determining a relationship between the first key and the second key based at least partly on the correlation metric indicating at least a threshold level of association between the first key and the second key, the relationship including at least one of:

a first service transferring the data object to a second service; or the second service transferring the data object to the first service, wherein the first service corresponds to a first service identifier included in the first key, and wherein the second service corresponds to a second service identifier included in the second key.

17. The one or more non-transitory computer-readable media of claim 15, the actions further comprising:
accessing the correlation information to determine a subset of the plurality of key associations for which the correlation metric indicates at least a threshold level of association;
identifying a singularly occurring key in the subset of the plurality of key associations; and
designating, as an origin of the data objects, the service corresponding to the service identifier included in the singularly occurring key.

18. The one or more non-transitory computer-readable media of claim 15, wherein:
the correlation metric includes a correlation count indicating a number of instances of association between each of the pairs of keys; and
the updating of the correlation metric includes incrementing the correlation count to indicate an additional instance of association between the one of the plurality of key associations that associates the pair of candidate keys.

19. The one or more non-transitory computer-readable media of claim 15, wherein the data object includes data for at least one of a product shipment or a product order being processed in the computing environment.

20. The one or more non-transitory computer-readable media of claim 15, wherein the key includes:
a key name corresponding to the data attribute included in the data object.

* * * * *